(12) United States Patent
Maier et al.

(10) Patent No.: US 10,767,660 B2
(45) Date of Patent: *Sep. 8, 2020

(54) SUPPORT ASSEMBLY FOR A TURBOMACHINE

(71) Applicant: DRESSER-RAND COMPANY, Olean, NY (US)

(72) Inventors: William C. Maier, Almond, NY (US); David J. Peer, Olean, NY (US); Andrew Jason Ranz, Cuba, NY (US); Joel D. Johnson, Bradford, PA (US)

(73) Assignee: DRESSER-RAND COMPANY, Olean, NY (US)

( * ) Notice: Subject to any disclaimer, the term of this patent is extended or adjusted under 35 U.S.C. 154(b) by 516 days.

This patent is subject to a terminal disclaimer.

(21) Appl. No.: 15/450,252

(22) Filed: Mar. 6, 2017

(65) Prior Publication Data

US 2017/0175771 A1  Jun. 22, 2017

Related U.S. Application Data

(63) Continuation of application No. 14/456,040, filed on Aug. 11, 2014, now Pat. No. 9,624,933.

(60) Provisional application No. 61/871,449, filed on Aug. 29, 2013.

(51) Int. Cl.
```
F04D 29/60    (2006.01)
F04D 29/42    (2006.01)
F04D 29/62    (2006.01)
F01D 25/28    (2006.01)
F02C 7/20     (2006.01)
F04D 17/12    (2006.01)
```
(Continued)

(52) U.S. Cl.
CPC ............. *F04D 29/60* (2013.01); *F01D 25/24* (2013.01); *F01D 25/28* (2013.01); *F02C 7/20* (2013.01); *F04D 17/12* (2013.01); *F04D 29/40* (2013.01); *F04D 29/4206* (2013.01); *F04D 29/624* (2013.01); *F05D 2230/644* (2013.01); *F05D 2260/38* (2013.01)

(58) Field of Classification Search
CPC .......... F01D 25/24; F01D 25/28; F04D 17/12; F04D 29/40; F04D 29/4206; F04D 29/60; E21B 17/1014; F05D 2260/38; F05D 2230/644
USPC .......................................................... 417/360
See application file for complete search history.

(56) References Cited

U.S. PATENT DOCUMENTS 3,740,168 A   6/1973   Hug et al.
3,752,427 A   8/1973   Bellati
3,764,098 A   10/1973  Dickinson
(Continued)

FOREIGN PATENT DOCUMENTS

DE   102012206855 A1   5/2013
EP      1820941 A1     8/2007
EP      2554800 A2     2/2013

*Primary Examiner* — Philip E Stimpert (57) ABSTRACT

A support assembly and method for supporting an internal assembly in a casing of a turbomachine are provided. The support assembly may include a support member that may be slidably disposed in a recess formed in the internal assembly and configured to engage an inner surface of the casing. A biasing member may be disposed in a pocket extending radially inward from the recess. The biasing member may at least partially extend into the recess and may be configured to apply a biasing force to the support member disposed therein.

6 Claims, 8 Drawing Sheets

(51) Int. Cl.
  *F01D 25/24*    (2006.01)
  *F04D 29/40*    (2006.01)

(56) References Cited

U.S. PATENT DOCUMENTS

| | | |
|---|---|---|
| 3,860,356 A | 1/1975 | Benz |
| 3,860,359 A | 1/1975 | De Feo |
| 4,284,154 A * | 8/1981 | England .............. E21B 17/1014 |
| | | 175/325.3 |
| 4,612,987 A * | 9/1986 | Cheek ...................... E21B 4/18 |
| | | 166/212 |
| 4,947,944 A * | 8/1990 | Coltman ................ E21B 7/062 |
| | | 175/325.3 |
| 5,560,439 A * | 10/1996 | Delwiche ........... E21B 17/1014 |
| | | 175/325.1 |
| 8,113,771 B2 | 2/2012 | Turnquist et al. |
| 8,182,207 B2 | 5/2012 | Ballard, Jr. et al. |
| 2003/0024710 A1* | 2/2003 | Post ................... E21B 17/1014 |
| | | 166/382 |
| 2013/0177413 A1* | 7/2013 | Klingler ................ F01D 25/246 |
| | | 415/213.1 |
| 2015/0354290 A1* | 12/2015 | Lakkashetti ............ E21B 17/07 |
| | | 175/56 |

* cited by examiner

SUPPORT ASSEMBLY FOR A TURBOMACHINE

CROSS-REFERENCE TO RELATED APPLICATIONS

This patent application is a continuation of co-pending U.S. patent application Ser. No. 14/456,040, filed Aug. 11, 2014, which claims priority to U.S. Provisional Patent Application having Ser. No. 61/871,449, which was filed Aug. 29, 2013. These priority applications are hereby incorporated by reference in their entirety into the present application to the extent the priority applications are consistent with the present application.

BACKGROUND

In conventional turbomachines, a casing may be provided separate from an internal assembly, such as a compression assembly, which is commonly referred to as a "bundle." The bundle of the turbomachines may often include impellers, seals, balance pistons, bearings, rotary shafts, and the like, and the casing may be configured to receive and support the bundle. To properly assemble the turbomachines, the internal assembly (e.g., the bundle) must be supported at or near its center of gravity to maintain its orientation, alignment, and/or position relative to the casing. Improper support of the internal assembly at or near its center of gravity may cause the internal assembly to engage or contact an inner surface of the casing, which may result in damage (e.g., galling) to the casing and/or the internal assembly. Some conventional turbomachines may utilize axially separated casing portions (e.g., upper and lower casing portions). In other turbomachines, the casing may not be separated into the upper and lower casing portions. Instead, the casing may only have open axial ends (e.g., radially split casings), and the turbomachines may be assembled via the axial insertion of the internal assembly via the open axial ends.

In turbomachines utilizing the separated casing portions (e.g., the upper and lower casing portions), external vertical supports may often be utilized to properly support the internal assembly at or near its center of gravity. However, in turbomachines where the casings only have the open axial ends, utilizing the external vertical supports may not be practical or possible. For example, during the axial insertion of the internal assembly via the open axial ends of the casing, portions of the internal assembly (e.g., portions disposed in the casing) may be inaccessible. The inaccessibility may prevent the internal assembly from being properly supported at or near its center of gravity.

In view of the foregoing, the turbomachines may often use internal supports disposed about and coupled with the internal assembly to facilitate the axial insertion of the internal assembly via the open axial ends. The internal supports may be configured to support the internal assembly and maintain the orientation, alignment, and/or position of the internal assembly relative to the casing during the assembly of the turbomachines. The internal supports, however, may often require constant manual adjustment and access to both axial ends of the internal assembly via both of the open axial ends of the casing. However, in turbomachines where the casing may only provide a single open axial end, or where only one of the axial ends is accessible, the manual adjustment may not be possible.

What is needed, then, is a turbomachine including a support assembly capable of supporting an internal assembly in a casing having a single accessible axial end.

SUMMARY

Embodiments of the disclosure may provide a support assembly for supporting an internal assembly in a casing of a turbomachine. The support assembly may include a support member that may be slidably disposed in a recess formed in the internal assembly and configured to engage an inner surface of the casing. A biasing member may be disposed in a pocket extending radially inward from the recess. The biasing member may at least partially extend into the recess and may be configured to apply a biasing force to the support member disposed therein.

Embodiments of the disclosure may further provide another support assembly for installing an internal assembly in a casing of a turbomachine. The support assembly may include a support member that may be slidably disposed in a recess formed in the internal assembly and configured to engage an inner surface of the casing. The support member may include a piston that may be slidably disposed in a pocket extending radially inward from the recess. An accumulator may be fluidly coupled with the pocket and configured to direct a hydraulic fluid to the pocket to thereby apply a biasing force to the piston disposed in the pocket.

Embodiments of the disclosure may further provide a method for supporting an internal assembly in a casing of a turbomachine. The method may include directing a hydraulic fluid from an accumulator to a pocket to apply a biasing force to a piston of a support member slidably disposed in the pocket. The support member may be slidably disposed in a recess formed in the internal assembly, and the pocket may extend radially inward from the recess. The method may also include actuating the support member radially outward such that the support member engages an inner surface of the casing. The method may further include applying the biasing force to the inner surface of the casing with the support member to thereby support the internal assembly in the casing.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
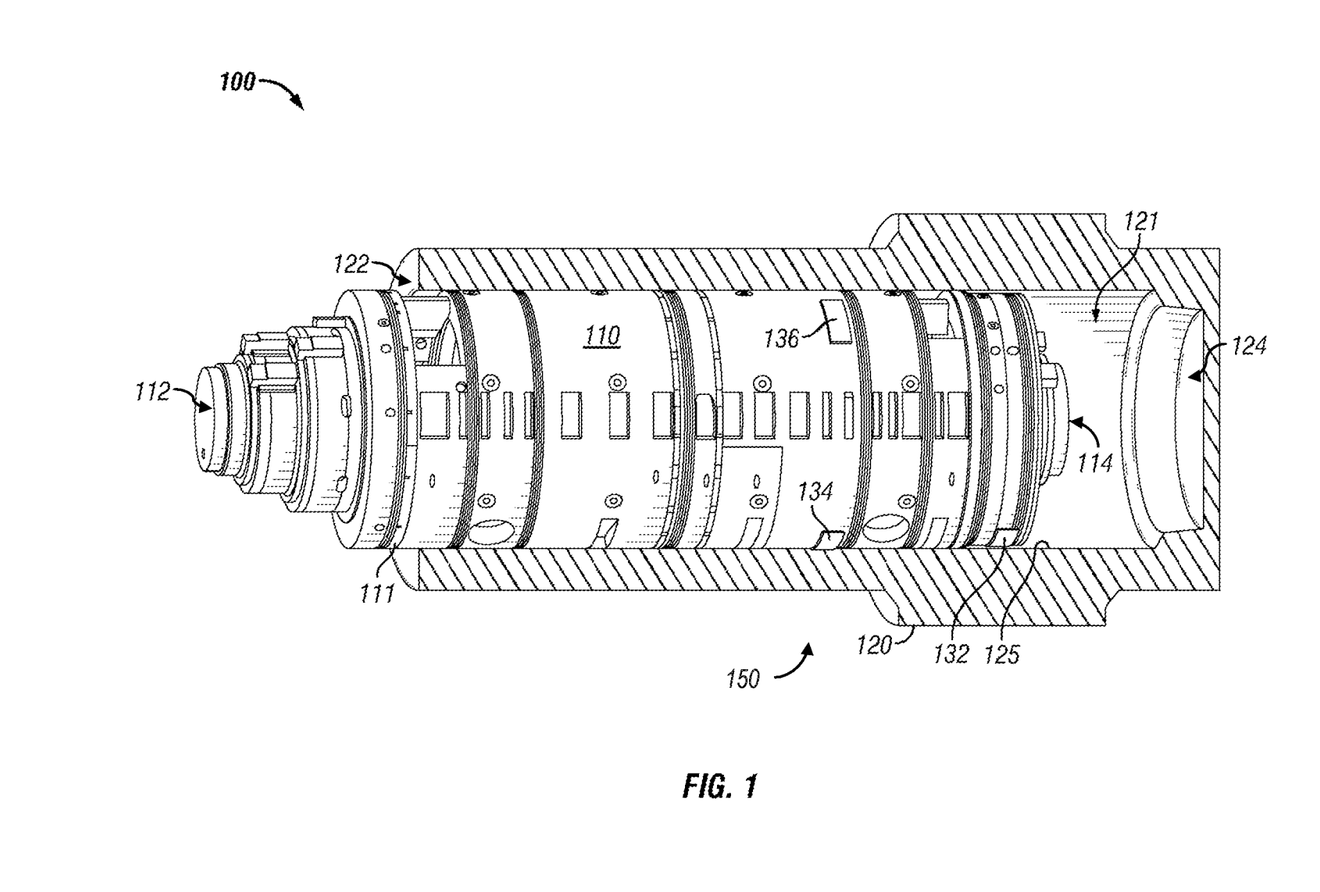
FIG. 1 illustrates a partial cutaway perspective view of an internal assembly supported in a casing of a turbomachine, according to one or more embodiments disclosed.

FIG. 1 illustrates a partial cutaway perspective view of an internal assembly 110 supported in a casing 120 of a turbomachine 100, according to one or more embodiments. In at least one embodiment, the internal assembly 110 may be or include, but is not limited to, a bundle, a motor, a pump, or the like, or any combination thereof, and the casing 120 may be any casing 120 configured to receive, secure, and/or support the internal assembly 110. For example, as illustrated in FIG. 1, the internal assembly 110 may be a modular bundle having one or more compression stages and the casing 120 may be a compressor casing configured to receive, secure, and/or support the modular bundle. The internal assembly 110 may include a first axial end portion 112 and a second axial end portion 114, which may also be referred to as a service end 112 and a non-service end 114, respectively. The casing 120 may also include a first axial end portion 122 and a second axial end portion 124, which may be referred to as a service end 122 and a non-service end 124, respectively. In at least one embodiment, an inner surface 125 of the casing 120 may define a cavity 121 configured to receive the internal assembly 110. The cavity 121 may at least partially extend from the service end 122 toward the non-service end 124 of the casing 120. In at least one embodiment, an outer surface 111 of the internal assembly 110 and/or the inner surface 125 of the casing 120 may be generally cylindrical in shape, and at least a portion of the inner surface 125 of the casing 120 may have a non-uniform or uneven surface topology.

To assemble the turbomachine 100, the internal assembly 110 may be inserted through the service end 122 of the casing 120 such that the non-service end 114 of the internal assembly 110 may be positioned or located proximal the non-service end 124 of the casing 120 and the service end 112 of the internal assembly 110 may be positioned proximal the service end 122 of the casing 120. While FIG. 1 illustrates the internal assembly 110 and the casing 120 in a horizontal orientation, the spatial orientation of the internal assembly 110 and the casing 120 is merely exemplary. Accordingly, it may be appreciated that the internal assembly 110 may be inserted through the service end 122 of the casing 120 while the internal assembly 110 and the casing 120 are in any spatial orientation. For example, the internal assembly 110 and the casing 120 may be horizontally-oriented, vertically-oriented, or any position therebetween during the assembly of the turbomachine 100.

In at least one embodiment, the non-service end 124 of the casing 120 and/or the non-service end 114 of the internal assembly 110 may be inaccessible during the assembly of the turbomachine 100. For example, as illustrated in FIG. 1, the non-service end 124 of the casing 120 may be a closed axial end of the casing 120. In another example, a separate system or assembly, such as a motor assembly (not shown), may be coupled with and/or disposed proximal the non-service end 124 of the casing 120, thereby impeding access to the non-service end 114 of the internal assembly 110. The inability to access the non-service end 114 of the internal assembly 110 may prevent adjustments and/or internal measurements (e.g., positional measurements) of the internal assembly 110 and/or components thereof via the non-service end 124 of the casing 120.

The turbomachine 100 may include a support system 150 configured to facilitate the insertion of the internal assembly 110 into the casing 120 and/or the removal of the internal assembly 110 from the casing 120. For example, the support system 150 may be configured to support the internal assembly 110 during the insertion and/or removal thereof into and/or from the casing 120. The support system 150 may also be configured to prevent an outer surface 111 of the internal assembly 110 from contacting or engaging the inner surface 125 of the casing 120, thereby substantially preventing damage to the internal assembly 110 and/or the casing 120. The support system 150 may also be configured to align the internal assembly 110 within the casing 120. The support system 150 may include one or more support assemblies (three are shown 132, 134, 136) disposed at various axial and/or circumferential positions along and/or about the internal assembly 110. As further described herein, the support assemblies 132, 134, 136 may at least partially extend or protrude radially outward from the outer surface 111 of the internal assembly 110 to support the internal assembly 110 and/or substantially prevent the internal assembly 110 from contacting the casing 120. While FIG. 1 illustrates three support assemblies 132, 134, 136, the number of support assemblies 132, 134, 136 and/or the position (e.g., axial and/or circumferential) of the support assemblies 132, 134, 136 are merely exemplary. Accordingly, it may be appreciated that the support system 150 may include any number of the support assemblies 132, 134, 136 positioned at varying axial and/or circumferential positions along and/or about the internal assembly 110.

In at least one embodiment, one or more of the support assemblies 132, 134, 136 may be lower support assemblies disposed at a lower portion (e.g., lower half and/or proximal a direction of gravitational body forces) of the internal assembly 110 and configured to support or suspend the internal assembly 110 within the casing 120 and/or prevent contact between the lower portion of the internal assembly 110 and the casing 120. For example, as illustrated in FIG. 1, a first lower support assembly 132 may be disposed at the lower portion of the internal assembly 110 near or proximal the non-service end 114, and a second lower support assembly 134 may be disposed at the lower portion of the internal assembly 110 between the service end 112 and the non-service end 114. Contact between the lower portion of the internal assembly 110 and the casing 120 may result from a mass or weight of the internal assembly 110. In another embodiment, one or more of the support assemblies 132, 134, 136 may be upper support assemblies disposed at an upper portion (e.g., upper half) of the internal assembly 110 and configured to prevent contact between the upper portion of the internal assembly 110 and the casing 120. For example, as illustrated in FIG. 1, an upper support assembly 136 may be disposed at the upper portion of the internal assembly 110 to prevent contact between the internal assembly 110 and the casing 120.

In at least one embodiment, the lower support assemblies 132, 134 may be configured to position the internal assembly 110 within the casing 120. For example, the lower support assemblies 132, 134 may be configured to align and/or position the internal assembly 110 with the casing 120 during the installation and/or removal thereof. The lower support assemblies 132, 134 may at least partially extend or protrude radially outward from the outer surface 111 of the internal assembly 110 and apply or exert a biasing force or load in the radially outward direction to align and/or position the internal assembly 110 within the casing 120. In at least one embodiment, the upper support assembly 136 may be configured to at least partially counter the biasing force of the lower support assemblies 132, 134 to thereby prevent contact between the upper portion of the internal assembly 110 and the casing 120. For example, the biasing force from the lower support assemblies 132, 134 may be sufficient to cause the upper portion of the internal assembly 110 to contact the casing 120. Accordingly, the upper support assembly 136 may be provided to counter the biasing force applied by the lower support assemblies 132, 134 and prevent contact between the upper portion of the internal assembly 110 and the casing 120.

In at least one embodiment, the support system 150 described herein may be utilized to monitor and/or indicate contact between the internal assembly 110 and the casing 120. For example, the support assemblies 132, 134, 136 may be electrically isolated from the internal assembly 110 and the casing 120. In another example, the support assemblies 132, 134, 136 may be fabricated from one or more insulating materials. The electrically isolated support assemblies 132, 134, 136 may prevent electrical continuity or electrical coupling between the internal assembly 110 and the casing 120. Accordingly, contact between the internal assembly 110 and the casing 120 may be monitored and/or indicated by measuring the electrical continuity therebetween.

Figure 2A:
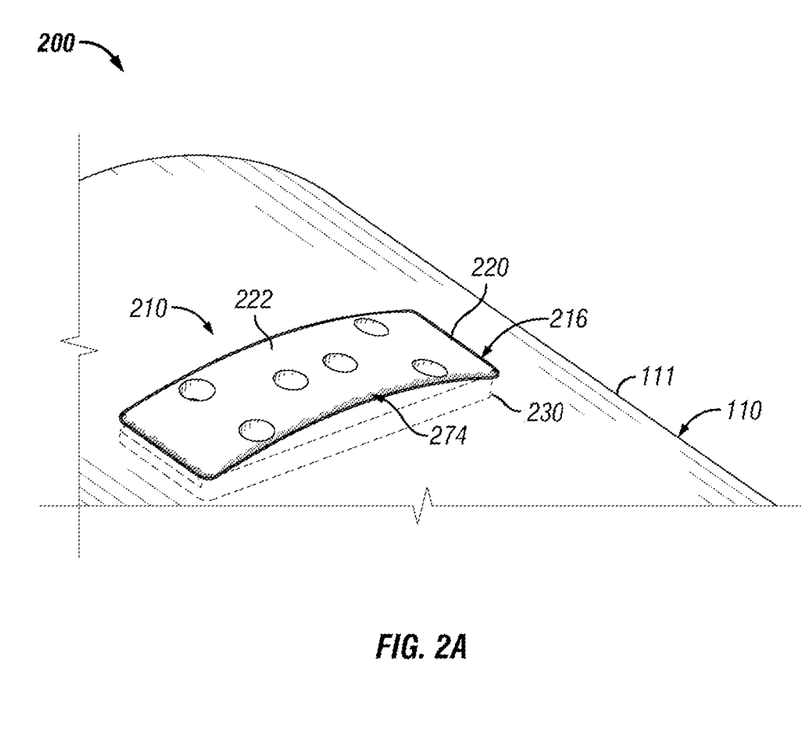
FIG. 2A illustrates a perspective view of a self-actuating support assembly that may be installed in the internal assembly of the turbomachine of FIG. 1, according to one or more embodiments disclosed.
Figure 2B:
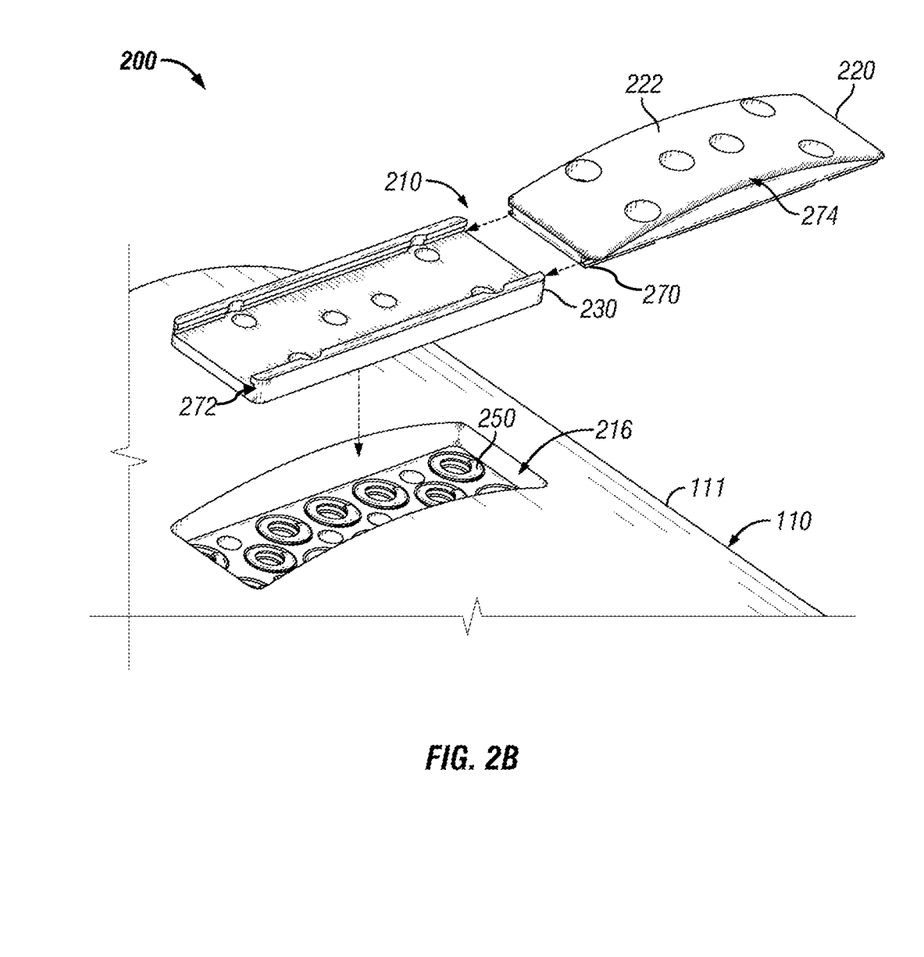
FIG. 2B illustrates an exploded view of the self-actuating support assembly of FIG. 2A, according to one or more embodiments disclosed.

One or more of the support assemblies 132, 134, 136 of the turbomachine 100 of FIG. 1 may be a self-actuating support assembly 200 illustrated in FIGS. 2A-2D. The self-actuating support assembly 200 may include a support member 210 slidably disposed in a recess 216 extending radially inward from the outer surface 111 of the internal assembly 110. The support member 210 may include a contact member 220 and a backing member 230 coupled with one another. For example, as illustrated in FIG. 2B, the contact member 220 may have a lip or protuberance 270 configured to mate with or engage a groove 272 formed in the backing member 230. It may be appreciated that the contact member 220 and the backing member 230 may be coupled with one another via any other coupling method, system, or device known in the art. For example, the contact member 220 and the backing member 230 may be coupled with one another via an adhesive. In an exemplary embodiment, at least a portion of the support member 210 may be arcuate. For example, one or more components of the support member 210 (e.g., the contact member 220) may be arcuate. In at least one embodiment, the support member 210 may be a skid pad 210.

In at least one embodiment, an outer surface 222 of the contact member 220 may define a beveled edge 274 extending along an outer edge portion thereof. The beveled edge 274 may be configured to facilitate the insertion and/or removal of the internal assembly 110 into and/or from the casing 120. For example, as previously discussed with reference to FIG. 1, the inner surface 125 of the casing 120 may have a non-uniform surface topology. Accordingly, the beveled edge 274 may allow the skid pad 210 to maintain optimal contact with the uneven surface topology of the inner surface 125, thereby facilitating the insertion and/or removal of the internal assembly 110 into and/or from the casing 120.

Figure 2C:
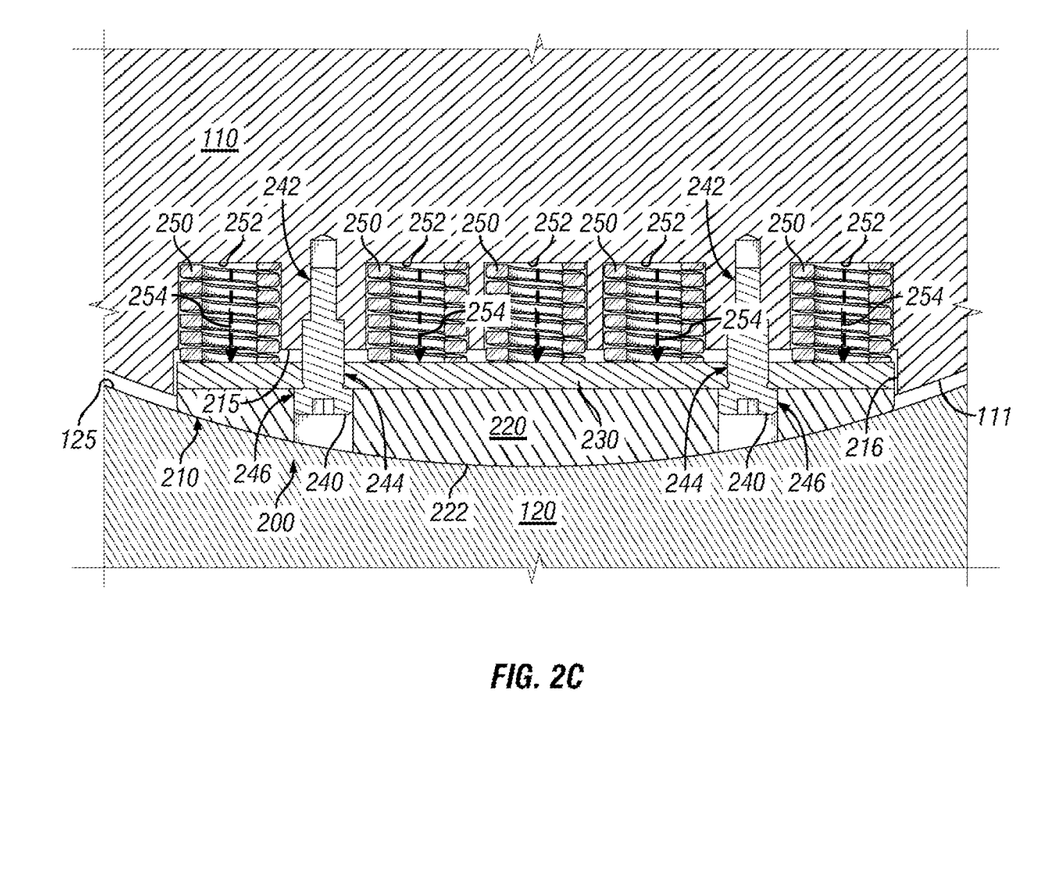
FIG. 2C illustrates a cross-sectional view of the self-actuating support assembly of FIG. 2A and 2B installed in the internal assembly of the turbomachine of FIG. 1 and in an extended position, according to one or more embodiments disclosed.
Figure 2D:
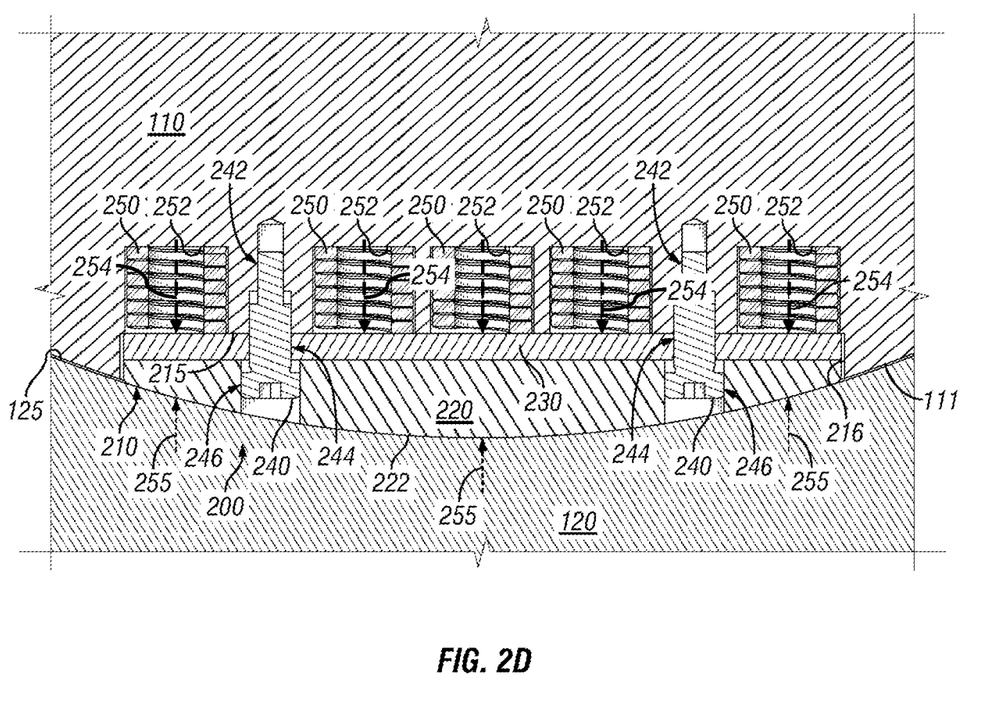
FIG. 2D illustrates another cross-sectional view of the self-actuating support assembly of FIG. 2A and 2B installed in the internal assembly of the turbomachine of FIG. 1 and in a seated position, according to one or more embodiments disclosed.

As illustrated in FIGS. 2C and 2D, the outer surface 222 of the contact member 220 may be curved radially outward toward the inner surface 125 of the casing 120. In at least one embodiment, the outer surface 222 of the contact member 220 may have a radius of curvature substantially equal to that of the outer surface 111 of the internal assembly 110. In another embodiment, the outer surface 222 of the contact member 220 may have a radius of curvature substantially equal to that of the inner surface 125 of the casing 120. As illustrated in FIGS. 2C and 2D, the contact member 220 may at least partially extend or protrude from the recess 216 and engage or contact the inner surface 125 of the casing 120.

In at least one embodiment, the skid pad 210 may be retained in the recess 216 of the internal assembly 110. For example, the contact member 220 and the backing member 230 coupled therewith may be retained within the recess 216 by one or more mechanical fasteners (two are shown 240). The mechanical fasteners 240 may be configured to retain the skid pad 210 within the recess 216 while allowing the skid pad 210 to be slidably disposed in the recess 216. For example, as illustrated in FIGS. 2C and 2D, the mechanical fasteners 240 may be or include bolts, such as shoulder bolts 240, having a threaded portion 242, an unthreaded shoulder portion 244, and a head portion 246. As further illustrated in FIGS. 2C and 2D, the shoulder bolts 240 may extend through the skid pad 210 and be coupled to the internal assembly 110 via the threaded portion 242. The shoulder bolts 240 may also extend through the skid pad 210 such that at least a portion of the skid pad 210 may be slidably disposed along the shoulder portion 244 of the shoulder bolts 240. For example, as illustrated in FIGS. 2C and 2D, the backing member 230 of the skid pad 210 may be slidably disposed along the shoulder portion 244 of the shoulder bolts 240. The head portion 246 of the shoulder bolts 240 may retain the skid pad 210 within the recess 216 of the internal assembly 110. For example, as illustrated in FIG. 2C, the head portion 246 may engage the backing member 230 to thereby retain the skid pad 210 within the recess 216.

FIG. 2C illustrates the self-actuating support assembly 200 in an extended position where the backing member 230 may be located or positioned proximal the head portion 246 of the shoulder bolts 240. The self-actuating support assembly 200 may be held in or urged toward the extended position by one or more biasing members (five are shown 250) disposed between the internal assembly 110 and the backing member 230. For example, the internal assembly 110 may define one or more blind holes or pockets 252 extending radially inward from the recess 216 and configured to receive at least a portion of the biasing members 250. As illustrated in FIG. 2C, the biasing members 250 may be at least partially disposed in the pockets 252 and may at least partially extend into the recess 216 to engage the backing member 230. The biasing members 250 may engage the backing member 230 to apply or exert a biasing force or load thereto, as indicated by arrow 254. The biasing force 254 may urge the skid pad 210 radially outward such that the contact member 220 engages the inner surface 125 of the casing 120. Accordingly, the biasing force 254 from the biasing members 250 may be applied to the inner surface 125 of the casing 120.

In at least one embodiment, the biasing member 250 may be or include any force producing system or device. For example, the biasing member 250 may be or include one or more electro-mechanical actuators, pneumatic cylinders, elastomeric members, or the like, or any combination thereof. In another example, as illustrated in FIGS. 2C and 2D, the biasing members 250 may be or include one or more springs 250. In at least one embodiment, a spring constant of the springs 250 may be varied such that the biasing force 254 applied to the skid pad 210 may be optimized. For example, the spring constant of the springs 250 may be varied to increase or decrease the biasing force 254 applied to the skid pad 210. It may be appreciated that the spring constant of each of the springs 250 may be greater than, less than, or equal to one another. In another embodiment, the number of springs 250 may be varied to increase or decrease the biasing force 254 applied to the skid pad 210. For example, the number of the springs 250 may be increased to correspondingly increase the overall biasing force 254 applied to the skid pad 210. In another embodiment, the arrangement or position of the springs 250 may be varied to increase or decrease the biasing force 254 applied to the skid pad 210. For example, the springs 250 may be closely packed with one another to thereby increasing the overall biasing force 254 applied to the skid pad 210.

FIG. 2D illustrates the self-actuating support assembly 200 in a seated position where the backing member 230 of the skid pad 210 may be located or positioned proximal an inner end surface 215 of the recess 216. An opposing force or load, as indicated by arrow 255, may be applied to the skid pad 210 in a direction opposite to the direction of the biasing force 254 to at least partially compress the springs 250 and urge the self-actuating support assembly 200 toward the seated position. In at least one embodiment, with continued reference to FIG. 1, the opposing force 255 may be applied by the casing 120 of the turbomachine 100. For example, the opposing force 255 may be a force applied by the casing 120 to support a mass of the internal assembly 110.

As previously discussed with reference to FIG. 1, the casing 120 may have an uneven surface topology along the inner surface 125 thereof. Accordingly, as the internal assembly 110 advances toward the non-service end 124 of the casing 120 the uneven surface topology of the inner surface 125 may apply an uneven load to the self-actuating support assembly 200. In at least one embodiment, the arrangement or configuration of the springs 250 and the backing member 230 may allow the load applied to the self-actuating support assembly 200 to be distributed or spread to each of the springs 250 via the backing member 230. For example, the opposing force 255 applied to a first portion of the contact member 220 may be transferred to the backing member 230, and the backing member 230 may distribute or spread the opposing force 255 to each of the springs 250. Accordingly, each of the springs 250 may absorb at least a portion of the opposing force 255 applied to the skid pad 210.

In at least one embodiment, the contact member 220 may engage the inner surface 125 of the casing 120 without causing damage (e.g., galling) thereto. For example, during the insertion and/or removal of the internal assembly 110 from the casing 120, the contact member 220 may engage and slide along the inner surface 125 of the casing 120 without causing damage thereto. In at least one embodiment, the contact member 220 may be or include one or more low friction materials such as TEFLON®. For example, the contact member 220 may be completely fabricated from TEFLON® or the contact member 220 may be fabricated with a TEFLON® coating. In another embodiment, the contact member 220 may be at least partially deformable or compressible to accommodate the uneven topology of the inner surface 125 of the casing 120. For example, the contact member 220 may be or include one or more elastomeric materials, including, but not limited to, one or more synthetic polymers, synthetic elastomers, synthetic rubber, or any combination thereof.

In an exemplary operation of the support system 150 in the installation of the internal assembly 110 in the casing 120, with continued reference to FIG. 1, the internal assembly 110 may be inserted through the service end 122 of the casing 120. Each of the support assemblies 132, 134, 136 installed in the internal assembly 110 may be the self-actuating support assembly 200 as described with reference to FIGS. 2A-2D. For example, the self-actuating support assembly 200 may be utilized as the upper support assembly 136 and the lower support assemblies 132, 134. The internal assembly 110 may be inserted through the service end 122 of the casing 120 such that the upper support assembly 136 and/or the lower support assemblies 132, 134 engage the inner surface 125. As the internal assembly 110 is inserted through the service end 122 of the casing 120 and advanced toward the non-service end 124, the biasing members 250 of the lower support assemblies 132, 134 may apply the biasing force 254 to the skid pads 210 to support and/or position the internal assembly 110 within the casing 120. The lower support assemblies 132, 134 may also prevent contact between the lower portion of the internal assembly 110 and the casing 120. The biasing members 250 of the upper support assembly 136 may apply the biasing force 254 to the skid pad 210 in an opposing radial direction relative to the biasing force 254 applied by the lower support assemblies 132, 134 to prevent contact between the upper portion of the internal assembly 110 and the casing 120.

The internal assembly 110 may be further advanced toward the non-service end 124 of the casing 120 such that the non-service end 114 of the internal assembly 110 may be positioned or located proximal the non-service end 124 of the casing 120 and the service end 112 of the internal assembly 110 may be positioned proximal the service end 122 of the casing 120. As previously discussed, the inner surface 125 of the casing 120 may have a non-uniform surface topology. Due to the non-uniform surface topology of the inner surface 125, an inner diameter of the casing 120 may vary (i.e., increase or decrease) from the service end 122 toward the non-service end 124. As the support assemblies 132, 134, 136 traverse along a portion of the casing 120 where the inner diameter of the casing 120 increases, the support assemblies 132, 134, 136 may be actuated toward the seated position (See FIG. 2D). Further, as the support assemblies 132, 134, 136 traverse along a portion of the casing 120 where the inner diameter of the casing 120 decreases, the support assemblies 132, 134, 136 may be actuated toward the extended position (See FIG. 2C). Accordingly, as the support assemblies 132, 134, 136 traverse the non-uniform surface topology of the inner surface 125, the skid pads 210 of the support assemblies 132, 134, 136 may oscillate or be actuated between the extended position (See FIG. 2C) and the seated position (See FIG. 2D) to accommodate variations in the surface topology and/or variations in the inner diameter of the casing 120.

Figure 3A:
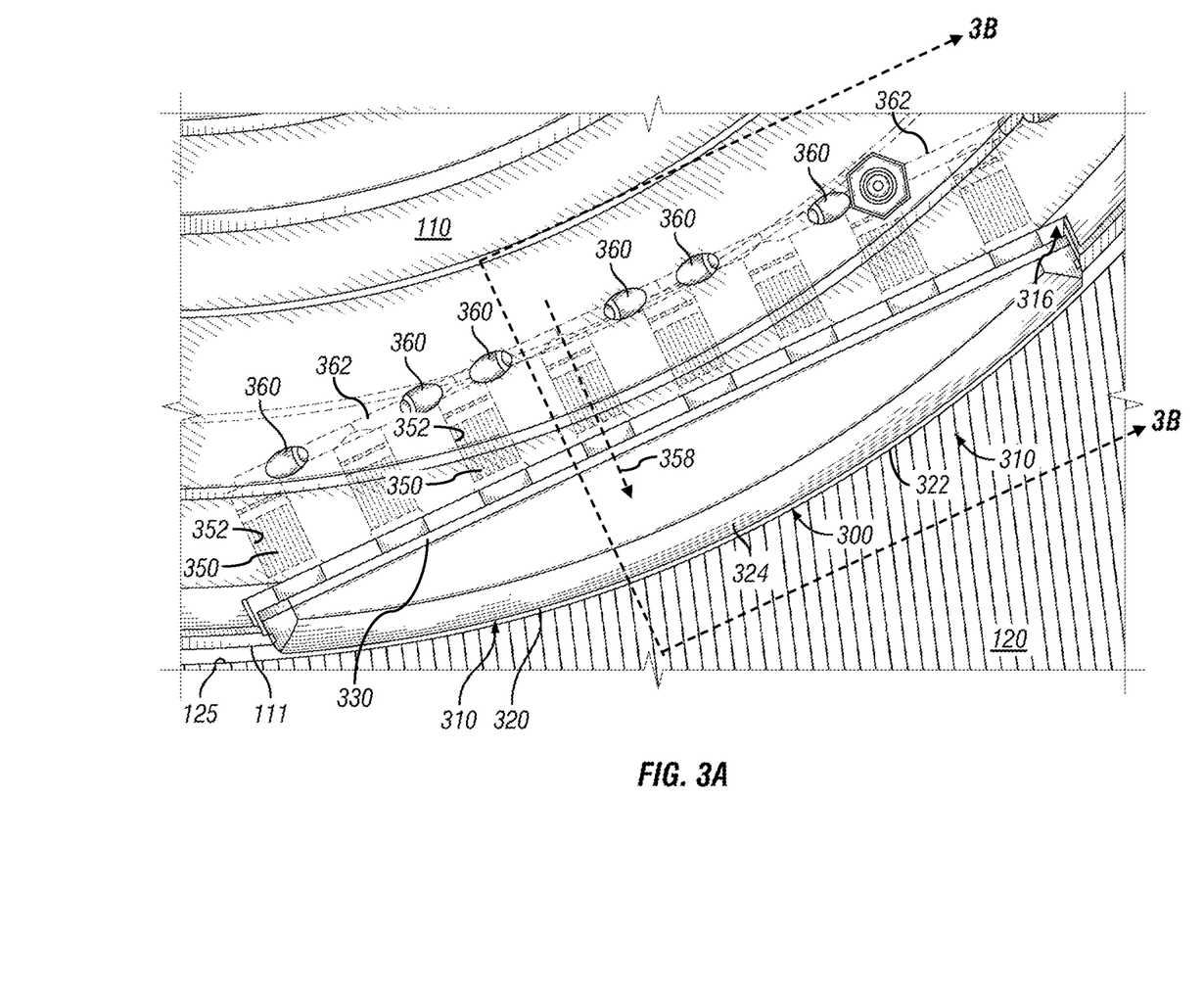
FIG. 3A illustrates a perspective view of a remotely-actuated support assembly that may be installed in the internal assembly of the turbomachine of FIG. 1, according to one or more embodiments disclosed.
Figure 3B:
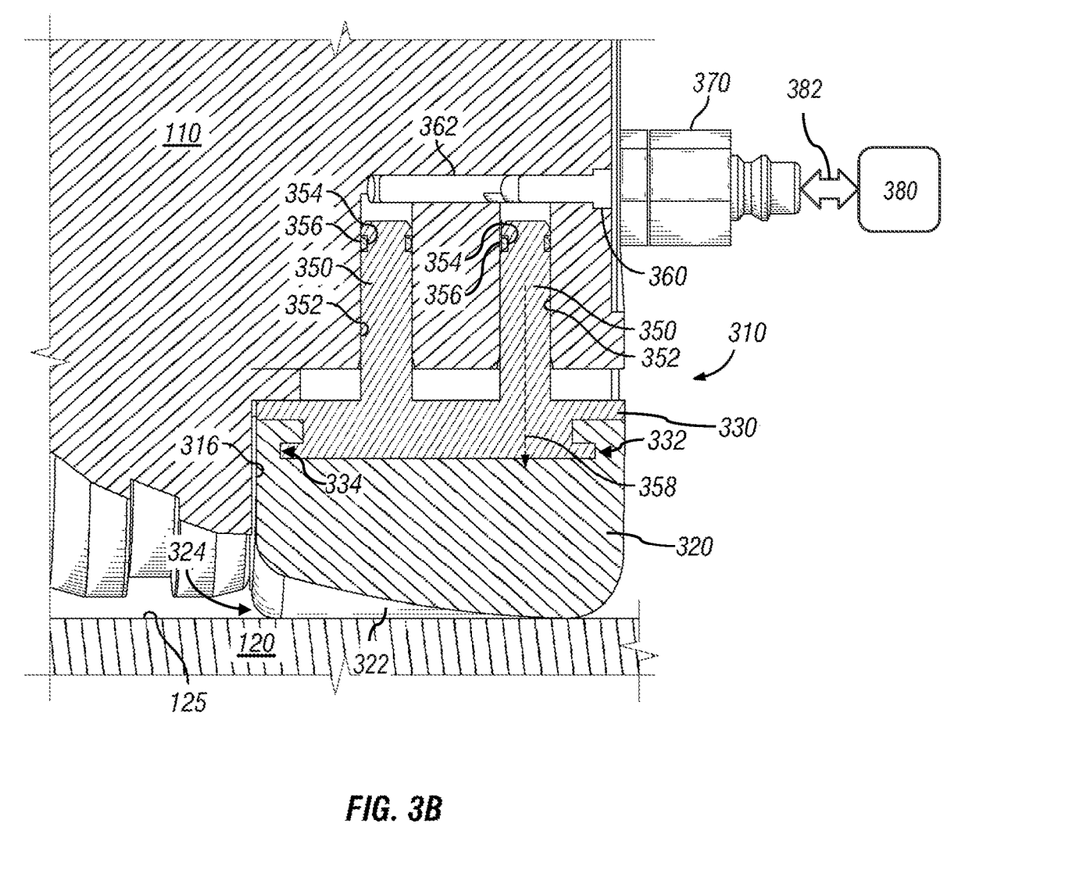
FIG. 3B illustrates a cross-sectional view taken along line 3B-3B of the remotely-actuated support assembly of FIG. 3A installed in the internal assembly of the turbomachine of FIG. 1, according to one or more embodiments disclosed.

In at least one embodiment, one or more of the support assemblies 132, 134, 136 of the turbomachine 100 of FIG. 1 may be a remotely-actuated support assembly 300 illustrated in FIGS. 3A and 3B. The remotely-actuated support assembly 300 may include a support member 310 slidably disposed in a recess 316 extending radially inward from the outer surface 111 of the internal assembly 110. The support member 310 may include a contact member 320 and a backing member 330 coupled with one another. For example, as illustrated in FIG. 3B, the backing member 330 may include a lip or protuberance 332 configured to mate with or engage a groove 334 formed in the contact member 320. It may be appreciated that the contact member 320 and the backing member 330 may be coupled with one another via any other coupling method, system, or device known in the art. For example, the contact member 320 and the backing member 330 may be coupled with one another via an adhesive. In an exemplary embodiment, at least a portion of the support member 310 may be arcuate. For example, one or more components of the support member 310 (e.g., the contact member 320) may be arcuate. In at least one embodiment, the support member 310 may be a skid pad 310.

In at least one embodiment, an outer surface 322 of the contact member 320 may define a beveled edge 324 extending along an outer edge portion thereof. The beveled edge 324 may be configured to facilitate the insertion and/or removal of the internal assembly 110 into and/or from the casing 120. In at least one embodiment, the outer surface 322 of the contact member 320 may have a radius of curvature similar to that of the outer surface 111 (See FIG. 3A) of the internal assembly 110. In another embodiment, the outer surface 322 of the contact member 320 may have a radius of curvature similar to that of the inner surface 125 of the casing 120 to optimize contact or engagement between the contact member 320 and the inner surface 125.

In at least one embodiment, the internal assembly 110 may define one or more pockets 352 extending radially inward from the recess 316. The backing member 330 may include one or more pistons 350 at least partially extending into the pockets 252 defined in the internal assembly 110. The pistons 350 may be slidably disposed in the pockets 352 and configured to at least partially control a radial position of the backing member 330 and the contact member 320 coupled therewith (i.e., the skid pad 310). The radial position of the skid pad 310 may determine, at least in part, the radial alignment and/or position of the internal assembly 110 relative to the casing 120.

In at least one embodiment, the pistons 350 may form a fluid tight seal with the pockets 352. For example, as shown in FIG. 3B, the pistons 350 may include one or more circumferential channels 354 having one or more seals 356 (e.g., O-rings) at least partially disposed therein and configured to provide the fluid tight seal between the pistons 350 and the pockets 352. In addition to, or in substitution of the seals 356, one or more guiding rings (not shown) configured to maintain the orientation of the pistons 350 within the pockets 352 may be disposed in the channels 354.

In at least one embodiment, the internal assembly 110 may define one or more ports 360 in the service end 112 and/or the non-service end 144 (see FIG. 1) of the internal assembly 110. At least one of the ports 360 may be fluidly coupled with at least one of the pockets 352. For example, the internal assembly 110 may define one or more fluid passages 362 configured to fluidly couple at least one of the ports 360 with at least one of the pockets 352. In at least one embodiment, the ports 360 may be configured to receive a fluid, such as a hydraulic fluid, and direct the hydraulic fluid to the pockets 352 via the fluid passages 362. The hydraulic fluid directed to the pockets 352 may apply or exert a biasing force or load to the pistons 350 slidably disposed therein, as indicated by arrow 358. The biasing force 358 may actuate the pistons 350 of the skid pad 310 in a radially outward direction, thereby causing the contact member 320 to engage the inner surface 125 of the casing 120. The contact member 320 may engage and apply the biasing force 358 to the inner surface of the casing 120 to radially align and/or position the internal assembly 110 within the casing 120.

In at least one embodiment, each of the pistons 350 may be actuated independently. For example, the fluid passages 362 may fluidly couple one of the pockets 352 with at least one of the ports 360. In another embodiment, a plurality of the pistons 350 may be actuated with one another. For example, the fluid passages 362 may fluidly couple a plurality of the pockets 352 with at least one of the ports 360.

As illustrated in FIG. 3B, one or more valves (one is shown 370) may be fluidly coupled with at least one of the ports 360. In at least one embodiment, the valve 370 may be a regulator valve configured to control a flow of the hydraulic fluid flowing therethrough. In another embodiment, the valve 370 may be or include a quick disconnect valve or a component thereof. The quick disconnect valve may be configured to detachably couple the ports 360 with one or more devices, assemblies, sources of hydraulic fluid, or any combination thereof. For example, as illustrated in FIG. 3B, the valve 370 may be a male component of the quick disconnect valve configured to engage a female component (not shown) of the quick disconnect valve. It may be appreciated that the valve 370 may be any valve capable of fluidly coupling the ports 360 with the one or more devices, assemblies, sources of hydraulic fluid, or any combination thereof.

In at least one embodiment, the valve 370 may fluidly couple the ports 360 with an accumulator 380. For example, as illustrated in FIG. 3B, the valve 370 may be fluidly coupled with the accumulator 380 via one or more lines, as indicated by arrow 382. The accumulator 380 may direct the hydraulic fluid to the pockets 352 to apply the biasing force 358 to the skid pad 310. The accumulator 380 may also maintain the hydraulic fluid in the pockets 352 at a pressure sufficient to apply the biasing force 358 to the skid pad 310 to support and/or position the internal assembly 110. The accumulator 380 may also be configured to maintain the pressure of the hydraulic fluid while allowing the skid pad 310 to be actuated radially inward or outward. For example, as the internal assembly 110 advances toward the non-service end 124 of the casing 120, the uneven surface topology of the inner surface 125 may actuate the pistons 350 radially inward, thereby ejecting at least a portion of the hydraulic fluid from the pockets 352 to the accumulator 380 via the fluid passages 362 and the ports 360. The accumulator 380 may receive the hydraulic fluid from the ports 360 while maintaining the remaining portion of the hydraulic fluid contained in the pockets 352 at a pressure sufficient to support the internal assembly 110 and/or preventing the internal assembly 110 from contacting the casing 120. Similarly, when the pistons 350 are actuated radially outward in response to the uneven surface topology of the casing 120, the accumulator 380 may direct the hydraulic fluid to the pockets 352 to maintain the pressure sufficient to support the internal assembly 110 and/or prevent the internal assembly 110 from contacting the casing 120.

In another exemplary operation of the support system 150 in the installation of the internal assembly 110 in the casing 120, with continued reference to FIG. 1, the internal assembly 110 may be inserted through the service end 122 of the casing 120. Any one or more of the support assemblies 132, 134, 136 installed in the internal assembly 110 may be the self-actuating support assembly 200 as described with reference to FIGS. 2A-2D and/or the remotely-actuated support assembly 300 as described with reference to FIGS. 3A and 3B. For example, the self-actuating support assembly 200 described in FIGS. 2A-2D may be utilized as the upper support assembly 136, and the remotely-actuated support assembly 300 described in FIGS. 3A and 3B may be utilized as the lower support assemblies 132, 134.

To assemble the turbomachine 100, the internal assembly 110 may be inserted through the service end 122 of the casing 120 such that the upper support assembly 136 and/or the lower support assemblies 132, 134 may engage the inner surface 125 of the casing 120. The hydraulic fluid from the accumulator 380 may be directed to the pockets 352 of the lower support assemblies 132, 134 via the ports 360 and the fluid passages 362. The hydraulic fluid directed to the pockets 352 may actuate the skid pads 310 of the lower support assemblies 132, 134 radially outward such that the contact members 320 of the lower support assemblies 132, 134 engage the inner surface 125 of the casing 120 and apply the biasing force 358 thereto. The biasing force 358 from the lower support assemblies 132, 134 may support the internal assembly 110 within the casing 120 and prevent the lower portion of the internal assembly 110 from contacting the casing 120. The biasing members 250 of the upper support assembly 136 may apply the biasing force 254 to the skid pad 210 thereof to oppose the biasing force 358 applied by the lower assemblies 132, 134, thereby preventing contact between the upper portion of the internal assembly 110 and the casing 120.

The internal assembly 110 may be further advanced toward the non-service end 124 of the casing 120 such that the non-service end 114 of the internal assembly 110 may be positioned or located proximal the non-service end 124 of the casing 120 and the service end 112 of the internal assembly 110 may be positioned proximal the service end 122 of the casing 120. As previously discussed, the inner surface 125 of the casing 120 may have a non-uniform surface topology, and the inner diameter of the casing 120 may vary (i.e., increase or decrease) from the service end 122 toward the non-service end 124. As the lower support assemblies 132, 134 traverse along the portion of the casing 120 where the inner diameter of the casing 120 decreases, the lower support assemblies 132, 134 may be actuated radially inward, thereby ejecting at least a portion of the hydraulic fluid from the pockets 352 to the accumulator 380 via the fluid passages 362 and the ports 360. The accumulator 380 may receive the hydraulic fluid while maintaining the pressure of the hydraulic fluid remaining in the pockets 352, thereby supporting and/or positioning the internal assembly 110 within the casing 120. Further, as the lower support assemblies 132, 134 traverse along the portion of the casing 120 where the inner diameter of the casing 120 increases, the lower support assemblies 132, 134 may be actuated radially outward, and the accumulator 380 may direct the hydraulic fluid to the pockets 352 to support and/or position the internal assembly 110. Accordingly, as the internal assembly 110 advances toward the non-service end 124 of the casing, the accumulator 380 may maintain the pressure of the hydraulic fluid in the pockets 352 as the lower support assemblies 132, 134 are actuated radially inward or outward, thereby accommodating the variations in the surface topology and/or the variations in the inner diameter of the casing 120. As previously discussed, the upper support assembly 136 (i.e., the self-actuating support assembly 200) may oscillate between the extended position (See FIG. 2C) and the seated position (See FIG. 2D) to accommodate the variations in the surface topology and/or the variations in the inner diameter of the casing 120.

Figure 4:
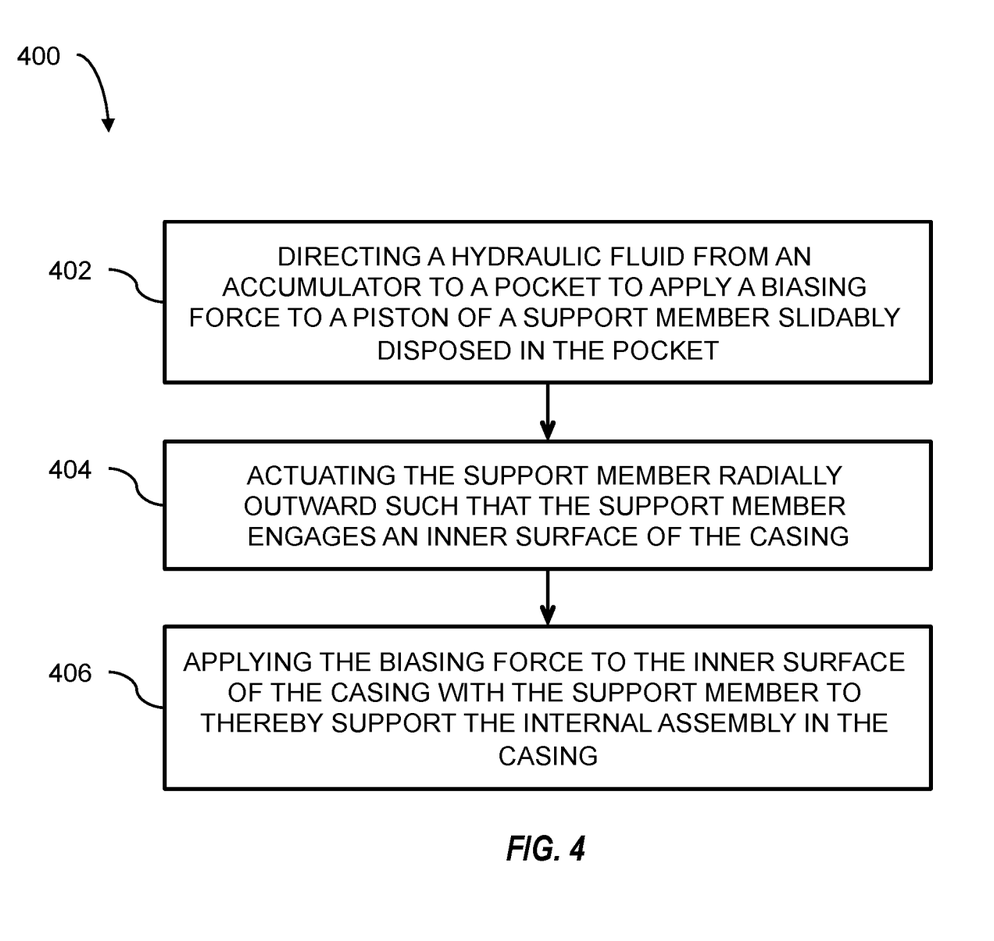
FIG. 4 is a flowchart of a method for supporting an internal assembly in a casing of a turbomachine, according to one or more embodiments disclosed.

FIG. 4 is a flowchart of a method 400 for supporting an internal assembly in a casing of a turbomachine, according to one or more embodiments. The method 400 may include directing a hydraulic fluid from an accumulator to a pocket to apply a biasing force to a piston of a support member slidably disposed in the pocket, as shown at 402. The method 400 may also include actuating the support member radially outward such that the support member engages an inner surface of the casing, as shown at 404. The method 400 may further include applying the biasing force to the inner surface of the casing with the support member to thereby support the internal assembly in the casing, as shown at 406.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A turbomachine, comprising:
a casing having an inner surface;
an internal assembly disposed within the casing and comprising a plurality of recesses formed in an outer surface of the internal assembly, each recess comprising a plurality of pockets extending radially inward from the respective recess; and
a plurality of support assemblies, each support assembly disposed at least partially within a respective recess of the plurality of recesses and comprising:
  a support member slidably disposed in the respective recess and configured to engage the inner surface of the casing, and
  a plurality of biasing members, each biasing member disposed within a respective pocket of the plurality of pockets of the respective recess and at least partially extending into the respective recess, and configured to apply a biasing force to the support member,
wherein each support member comprises a contact member and a backing member, the contact member being configured to engage the inner surface of the casing and the backing member being configured to be engaged by a respective plurality of biasing members, and further wherein the contact member of each support member has a protuberance configured to mate with a groove formed in a respective backing member.

2. The turbomachine of claim 1, wherein each support member comprises an insulating material configured to electrically isolate the internal assembly from the casing.

3. The turbomachine of claim 1, wherein an outer surface of the contact member has a radius of curvature equal to a radius of curvature of the inner surface of the casing.

4. The turbomachine of claim 1, wherein each contact member comprises an elastomeric material.

5. The turbomachine of claim 1, wherein each support assembly further comprises a mechanical fastener, the mechanical fastener extending through at least a portion of the respective support member and being coupled with the internal assembly, the mechanical fastener configured to retain the respective support member within the respective recess while allowing the respective support member to be slidably disposed in the respective recess.

6. A turbomachine, comprising:
a casing having an inner surface;
an internal assembly disposed within the casing and comprising a plurality of recesses formed in an outer surface of the internal assembly, each recess comprising a plurality of pockets extending radially inward from the respective recess; and
a plurality of support assemblies, each support assembly disposed at least partially within a respective recess of the plurality of recesses and comprising:
  a support member slidably disposed in the respective recess and configured to engage the inner surface of the casing, and
  a plurality of biasing members, each biasing member disposed within a respective pocket of the plurality of pockets of the respective recess and at least partially extending into the respective recess, and configured to apply a biasing force to the support member,
wherein each support member comprises a contact member and a backing member, the contact member being configured to engage the inner surface of the casing and the backing member being configured to be engaged by a respective plurality of biasing members,
wherein each support assembly further comprises a mechanical fastener, the mechanical fastener extending through at least a protion of the support member and coupled wuth the internal assembly, the mechanical fastener configured to retain the support member at least partially within the recess while allowing the support member to be slidably disposed in the recess wherein the mechanical fastener comprises:
a threaded portion configured to couple the mechanical fastener with the internal assembly;
a shoulder portion extending the respective backing member, the respective backing member configured to slide along the shoulder portion; and
a head portion configured to engage the backing member by direct contact therewith, thereby retaining the support member at least partially within the recess.

* * * * *